United States Patent [19]

Gende

[11] 4,343,460
[45] Aug. 10, 1982

[54] FORCE-RECEIVING AND APPLYING DEVICE

[76] Inventor: Joseph J. Gende, 4311 7th Ave., Moline, Ill. 61265

[21] Appl. No.: 136,184

[22] Filed: Mar. 31, 1980

Related U.S. Application Data

[63] Continuation-in-part of Ser. No. 961,804, Nov. 17, 1978, abandoned.

[51] Int. Cl.³ .............................................. F16F 3/10
[52] U.S. Cl. .................................. 267/151; 267/22 R
[58] Field of Search ................... 267/8 B, 22 R, 150, 267/151, 168, 170, 173

[56] References Cited

U.S. PATENT DOCUMENTS

| 2,464,326 | 3/1949 | MacGregor | 267/22 R X |
| 3,115,337 | 12/1963 | Musgrave | 267/151 |
| 3,244,399 | 4/1966 | Jones et al. | 267/168 X |
| 3,404,877 | 10/1968 | Darnell | 267/168 X |
| 3,689,055 | 9/1972 | Gende | 267/150 |

Primary Examiner—Duane A. Reger
Attorney, Agent, or Firm—Henderson & Sturm

[57] ABSTRACT

A force-receiving and -applying device with biasing means providing a substantially constant spring force and including a coil spring backing up a piston or the like and secondary biasing means coaxial with the coil spring and acting in conjunction with the coil spring to combine to produce said substantially constant spring force.

16 Claims, 8 Drawing Figures

FORCE-RECEIVING AND APPLYING DEVICE

This application is a continuation-in-part of copending United States application Ser. No. 961,804, filed Nov. 17, 1978, now abandoned.

SUMMARY OF THE INVENTION

U.S. Pat. No. 3,689,055 to Joseph Gende provides a linear rate spring mechanism including main and auxiliary springs coacting to produce a linear (including constant) output. In that patent, a main member is movable back and forth along the axis of a cylindrical bore and is biased by a coil spring disposed coaxially within the bore. A second bore is arranged at right angles to the first bore and contains a second coil spring coaxially within the second bore and acting through link means on the main member. The spring rates are selected with respect to each other so that the forces are relatively offsetting, resulting in a net linear output. As shown and explained in that patent, the mathematics provide an exact result, but the mechanism is relatively complicated and expensive and forces act normal to each other.

The present invention is a significant improvement over the patented structure, especially in that it affords a far less costly device, one that can be mass-produced as a compact unit, and utilizes components coaxially arranged within a hollow cylinder. Although, like the patented mechanism, the present invention can be utilized in areas enumerated in the patent, it is aimed primarily at the field of dispensing, such as sprays, creams and like flowable substances. For example, it can replace propellant-type or so-called aerosol sprays.

Briefly stated, the invention resides in a coaxial assembly of two biasing means which coact to provide a substantially constant resistance to forces applied to the device via its piston, as when the unit is charged with the substance it will dispense, and to provide a substantially constant force to the substance being dispensed. The coaxially arranged elements in the cylinder include a piston backed up by a coil spring that biases the piston toward that end of the cylinder at which force is received or applied, together with toggle linkage and a second spring, also behind the piston, the coil spring and secondary biasing means coacting to provide the above results in a unitary, compact package.

DETAILED DESCRIPTION

Figure 1:
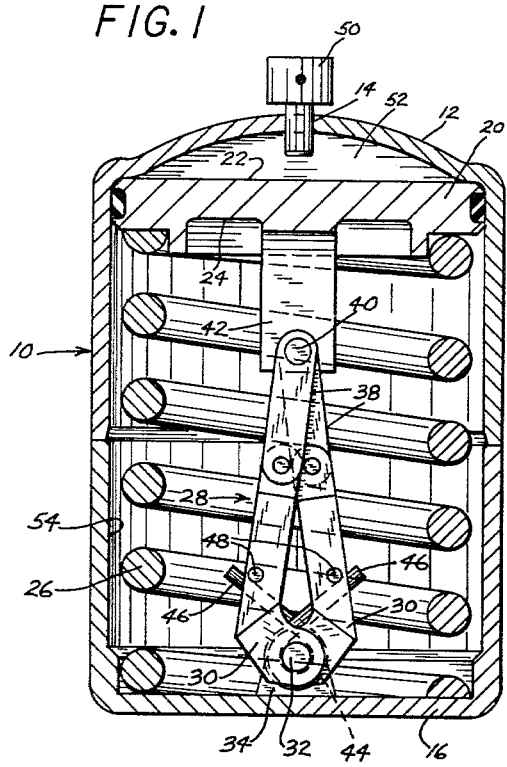
FIG. 1 is a section through the plane of the axis of the unit, showing the coil spring almost fully unloaded and the secondary biasing means providing its maximum loading in the direction of the coil spring.

A hollow cylinder 10 has a first end 12 provided with an opening 14 and also has a second end 16 providing an abutment. A force-receiving and -applying member, here a piston 20, is reciprocably disposed within the cylinder for movement back and forth between opposite ends of the cylinder and has a front face 22 and a back 24. The front face is adapted to receive force via the opening 14, as when the unit is loaded or whatever force is applied when the unit is used in other fields. The front face also exerts force via the opening when the unit unloads under force of the biasing means to be described immediately below.

The main biasing means is preferably a coil spring 26 seating at one end against the back of the piston 20 and seating at its other end on the abutment 16. The spring biases the piston toward the first or top end of the unit (FIG. 1). As is well known, the typical coil spring increases its force as it is compressed and loses its force as it "decays". For this reason, the coil spring alone is not acceptable where a substantially constant force is required. Thus the need for a secondary biasing means, which may take many forms as set forth in the Gende patent, along with congenital defects in those other forms.

Figure 4:
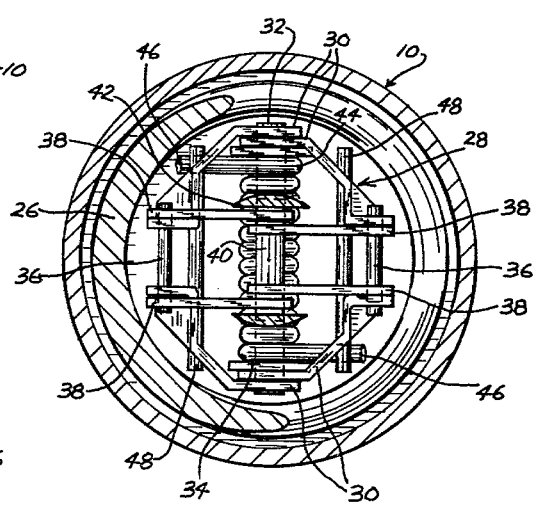
FIG. 4 is a section on the line 4—4 of FIG. 2.

According to the present invention, those basic defects, along with those inherent in the Gende patent itself, are eliminated by a secondary biasing means, designated in its entirety at 28. This means is made up of a first pair of links 30 pivoted at their lower ends on a common axis by a pivot shaft 32 mounted at 34 on the abutment means. The free end of each link is pivotally connected at 36 to a link 38, there being two such links to make up a second pair of links. The opposite ends of the links 38 are connected via a common pivot 40 to an integral extension 42 of the back of the piston 20. The axes of the pivot shaft 32, the pivots 36 and the pivot 40 are parallel and normal to the axis of the cylinder, and the links swing back and forth toward and away from the cylinder axis when actuated. As seen in FIG. 4, each pair of links 30, 38 includes a double link for stability and balance. As seen further in that Figure, the extension 42 of the back of the piston 20 is bifurcated to accommodate the ends of all the links.

A further part of the secondary biasing means includes in addition to the toggle established by the links 30, 38, a second spring, here in the form of a torsion spring 44 wrapped around or coaxially carried by the pivot shaft 32 for the lower links 30. Since the mated links 30 are spaced apart along this shaft, the spring 44 is conveniently and compactly located between the links and has opposite ends or arms 46 acting on the links 30 via cross bars 48 affixed to the links. These bars add further to the stability of the linkage. The bias in the spring 44 is such as to urge the linkage to the initial position of FIG. 1, in which state both springs 26 and 44 are at substantially zero load.

The operation of the unit will be described in terms of its use as a dispenser of flowable substance such as sprays, creams, etc., it being understood from this that such description will make clear to those skilled in the art that the unit may be adapted to other fields, such as those pointed out in the Gende patent.

The unit here is adapted to form a container made up of the cylinder and its end walls. Its dimensions are on the order of 2½ inches (62 mm) in diameter and about 4 inches (10.25 mm) in height. The top wall 12 is shaped typically as a dome and the opening 14 is fitted with a valved outlet element 50 of any well-known type, such as those commonly found on spray cans. Since this outlet element is conventional, it will not be described in detail. It works in typical fashion, requiring only that its cap be depressed to achieve dispensing. The piston 20 divides the cylinder into upper and lower chambers 52 and 54, the latter of which contains the secondary biasing means 28 and the upper of which contains substance to be dispensed.

Figure 2:
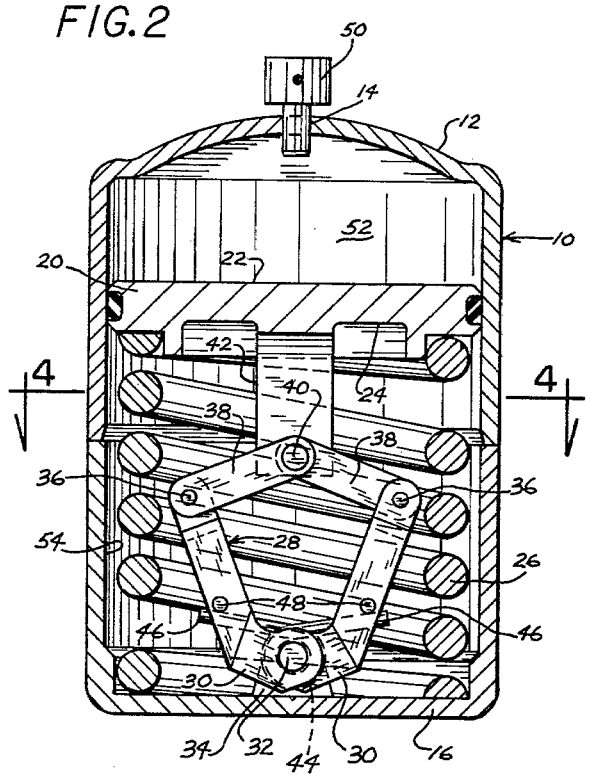
FIG. 2 is a similar section, showing the unit in which coil spring is about half loaded and the auxiliary spring is almost fully loaded, but the secondary biasing means is providing almost zero load in the direction of the coil spring.
Figure 5:
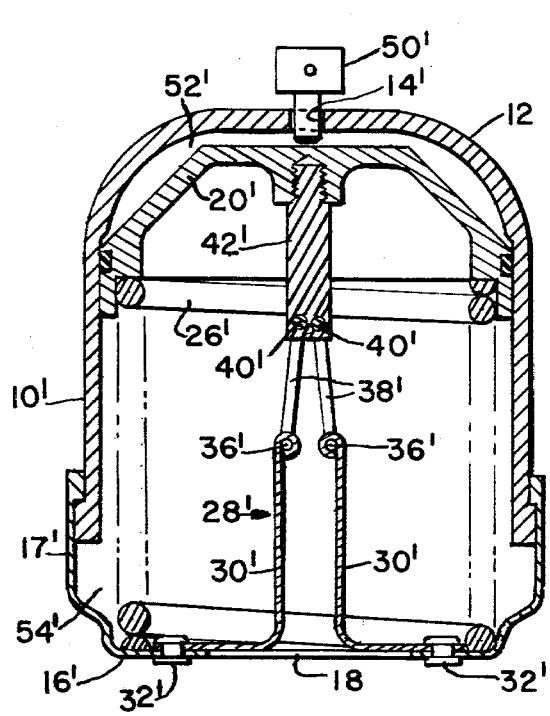
FIG. 5 is a section like that in FIG. 1 but showing a modified form of the invention.
Figure 8:
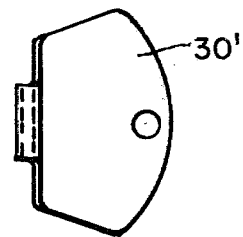
FIG. 8 is a plan view of one of the springs shown in FIG. 7.

In the modification shown in FIG. 5, the same numerals as used in FIG. 1 will be used but will be primed in order to relate the several parts. Thus, the container will be recognized at 10′ as having upper and lower ends 12′ and 14′, the container in this case having its bottom formed as a cup 17 sealed to the upper part. A coiled spring 26′ acts between the bottom 16′ and a piston 20′ and is comparable to the spring 20, and this spring is backed up by secondary biasing means 28′, here in the form of a pair of mirror-image leaf springs 30′ conjoined with links 38′ that are pivoted at 36′ to the springs and at 40′ to a downward extension 42′ of the piston. The leaf springs are L-shaped and have their lower legs anchored to the container bottom 16′ by suitable rivets 32′. The container is divided by the piston 20′ into upper and lower chambers 52′ and 54′ and a dispensing opening is provided at 14′, controlled by a button 50′, all as comparable to the elements previously described. The linkage 28′ operates in the same manner as that at 28; i.e., as the piston descends, the links 38′ move outwardly, spreading the upper ends of the leaf springs 30′. Compare FIG. 2, followed by a result similar to FIG. 3. The links 38′ may be constructed as U-shaped or otherwise to be suitably associated with and pivoted to the springs 30′. The bottom of the end cap 17 of the container 10′ may have a central irregularly shaped opening 18 that is closed by the horizontal legs of the springs 30′, which are arcuate in form as shown in FIG. 8. When the legs are riveted in place, the end of the container is completely closed.

Figure 6:
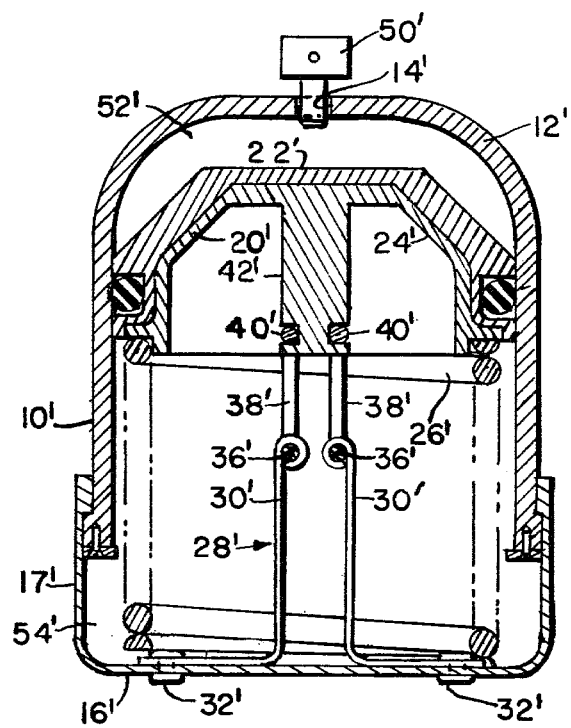
FIG. 6 is a similar section but showing a still further modification.
Figure 7:
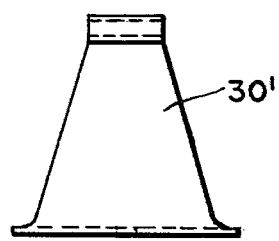
FIG. 7 is an end view of one of the springs used in the embodiment of FIGS. 5 and 6.

The modification shown in FIG. 6 is quite similar to that of FIG. 5, except for differences in the piston and end cap. The piston is of multi-piece construction to lend itself to a modified method of assembly, and the end wall of the cap 17 is completely closed; although, the same springs 30′ may be used. Otherwise, the parallels in construction are deemed to be so similar as to require no additional description. The use of corresponding reference numerals will coordinate the relationship.

The operation of the invention will be next described in terms of the FIG. 1 through FIG. 4 construction, it being clear that all forms function alike within the scope of the invention.

Figure 3:
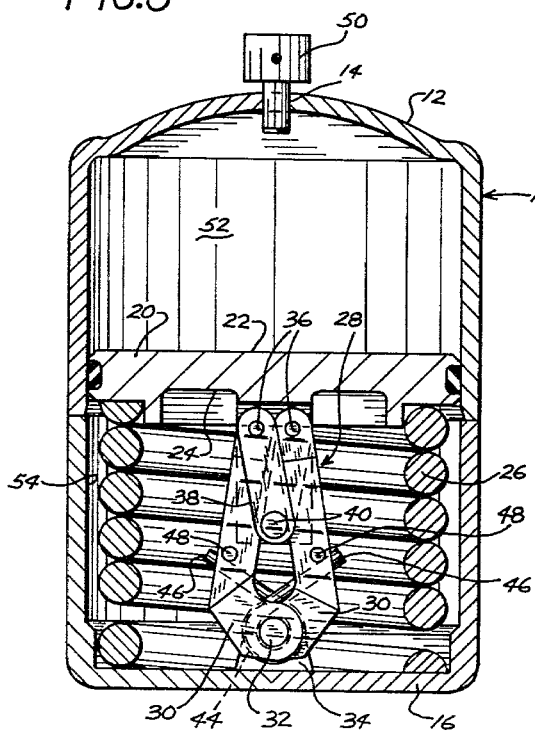
FIG. 3 is a like section, showing the unit in a stage in which the coil spring is fully loaded or compressed and the secondary biasing means is providing its maximum load in the direction opposing the coil spring.

The substance to be dispensed may be introduced under pressure via the opening 14 or in any other suitable manner. In this case, the selected pressure is approximately 50 psi (22 kg per 6.5 square centimeters) but of course could be less; e.g., 10 to 20 psi (4.4 to 8.8 kg per 6.5 square centimeters). As this pressure is attained in the chamber 52, the load on the coil spring 26 increases and the mechanism passes through stages; e.g., FIG. 1, 2 and 3, until the spring 26 is fully loaded (FIG. 3).

In FIG. 1, both springs are under zero load. As the piston is forced downwardly by pressure in the chamber 52 to the position of FIG. 2, the mechanism is at about its half-way stage as the linkage approaches an almost dead-center position. Just beyond or downwardly of the FIG. 2 position, the coil spring is half loaded and the torsion spring reaches full load as the links 30, 38 attain a dead-center position. Now, as the piston is forced further downwardly, the pivot shaft 40 passes below "dead center", ultimately attaining the FIG. 3 position. During this movement, the torsion spring urges the lower links 30 inwardly, along with the upper links, thus unloading the torsion spring but causing a greater downward bias.

When the valved outlet 50 is depressed, fluid, etc., under pressure in the upper chamber 52 is dispensed, and the piston 20 moves upwardly under the force of the coil spring 26. During this stage, the force exerted by the coil spring decreases, but this decrease is offset by the increasing force exerted by the biasing means 28. This result is brought about by selection of the spring rates and link dimension. That is, the spring rate of the torsion is selected with respect to the spring rate of the coil spring and the spring force of the torsion spring is selected with respect to the linkage forces so that the combined force on the piston is substantially linear. The formula set forth in the Gende patent may be used to develop the mechanism here. On the other hand, when the unit is used in other areas, as when it is important that the unit establish a substantially constant resistance to forces exerted on the piston vis the outlet (inlet) 14, the combination of the coil spring and the secondary biasing means will produce that result.

I claim:

1. A force-receiving and -applying device, having a hollow cylinder having a first end including an opening and a second end including an abutment; a pixton axially reciprocable within the cylinder and having a front face adapted to receive and to apply force via said opening; a first coil spring coaxially disposed within the cylinder between the back of the piston and the abutment and biased to urge the piston toward the first end of the cylinder; and secondary biasing means operative on the piston in conjunction and simultaneously with the coil spring, and having such spring rate relative to that of the coil spring as to offset at least some of the forces of the coil spring, so that the coil spring and secondary biasing means together provide a substantially constant resistance to movement of the piston when force is received by the piston and to apply a substantially constant force to the piston when force is applied by the piston, characterized in that the secondary biasing means is disposed coaxially within the cylinder between the abutment and the back of the piston.

2. The device of claim 1, characterized in that the secondary biasing means includes link means between the piston and the abutment and a second spring acting on the link means.

3. The device of claim 2, in which the link means includes a toggle.

4. The device of claim 2, in which the second spring is a torsion spring.

5. The device of claim 1, further characterized in that the secondary biasing means includes a first link pivoted to the abutment on an axis normal to the cylinder axis, a second link pivotally connected to the first link and to the back of the piston, and a second spring acting on at least one of said links.

6. The device of claim 5, in which the second spring is a torsion spring.

7. The device of claim 1, further characterized in that the secondary biasing means includes a first pair of links pivoted to the abutment on a pivot having its axis normal to the cylinder axis and swingable toward and away from the cylinder axis, a second pair of links, each link of said second pair being pivotally connected to a respective one of said first links and having a pivotal connection to the piston, said second links being movable lengthwise of the cylinder as the first links swing back and forth, and a second spring acting on the first links and biasing said first links toward the cylinder axis.

8. The device of claim 7, in which the pivotal connection of the second links to the piston is a single pivot common to both of said second links.

9. The device of claim 8, in which the second spring is a torsion spring mounted on the first link pivot and having opposite arms acting respectively on the first links.

10. The device of claim 9, in which the first links are spaced apart along the axis of the pivot to the abutment and the torsion spring is disposed between said first links and coiled about said pivot.

11. The device of claim 1, further characterized in that the secondary biasing means includes a pair of leaf springs acting against the abutment and projecting toward and having upper ends spaced axially short of the back of the piston, and a pair of links connected respectively at opposite ends to the back of the piston and to the upper ends of the leaf springs.

12. The device of claim 11, further characterized in that each leaf spring is of L shape, having an axial leg connected to the associated link and a transverse leg connected to the abutment.

13. The device of claim 12, further characterized in that the abutment comprises the radial end wall of the container and the horizontal legs of the leaf springs are riveted to said wall.

14. The device of claim 1, further characterized in that the secondary biasing includes at least one leaf spring and link means connected between the leaf spring and the back of the piston.

15. The device of claim 14, further characterized in that there are a pair of leaf springs respectively having axially extending legs including upper ends spaced apart transverse to the axis and spaced axially short of the back of the piston, and the link means are connected to the back of the piston and to said upper ends so as to spread said upper ends apart when force is received by the piston.

16. The device of claim 15, further characterized in that each leaf spring, in addition to its upper end, has a lower end proximate to and fixed to the abutment.

* * * * *